(12) United States Patent
Simon (10) Patent No.: US 6,230,388 B1
(45) Date of Patent: May 15, 2001

(54) METHOD FOR PRODUCING A STATOR FOR ELECTRIC MACHINES

(75) Inventor: Bernhard Simon, Freigericht (DE)

(73) Assignee: Statomat GmbH (DE)

( * ) Notice: Subject to any disclaimer, the term of this patent is extended or adjusted under 35 U.S.C. 154(b) by 0 days.

(21) Appl. No.: 09/323,946

(22) Filed: Jun. 2, 1999

(30) Foreign Application Priority Data

Jun. 4, 1998 (DE) .............................................. 198 24 920

(51) Int. Cl.⁷ ..................................................... H02K 15/06
(52) U.S. Cl. ................................. 29/596; 29/732; 29/736
(58) Field of Search .............................. 29/596, 732, 734, 29/736

(56) References Cited

U.S. PATENT DOCUMENTS 4,723,354 * 2/1988 Moser ...................................... 29/596
5,542,456   8/1996 Nishimura et al. .

FOREIGN PATENT DOCUMENTS 31 14 407    3/1989 (DE) .

* cited by examiner

Primary Examiner—Carl E. Hall
(74) Attorney, Agent, or Firm—Larson & Taylor, PLC

(57) ABSTRACT

A method for producing a stator for electric machines, wherein a plurality of coils (10) is prewound and drawn into a stator lamination package. Subsequently the wire ends (14) of the coils (10) are fixed in place in a predetermined position. In order to be able to interconnect the wire ends or to fix them more dependably and faster in place at the terminals or auxiliary terminals provided, it is proposed that they are temporarily connected with a holding element (34) immediately after a coil (10) or group of coils has been wound, that this connection is maintained during the draw-in of the coils (10) into the stator lamination package, and that thereafter the wire ends (14) are mechanically transferred into their predetermined position.

4 Claims, 7 Drawing Sheets

Fig. 3

METHOD FOR PRODUCING A STATOR FOR ELECTRIC MACHINES

FIELD OF THE INVENTION

The invention relates to a method for producing a stator for electric machines, wherein a plurality of coils is pre-wound and drawn into a stator lamination package, and wherein prior to draw-in the wire ends of the coils are temporarily connected in a defined pre-aligned position with a holding element, which is separate from the stator lamination package, and after draw-in they are fixed in place in a predetermined position in respect to the stator lamination package. The invention also relates to a draw-in tool element for executing the method.

BACKGROUND OF THE INVENTION

It is a common practice to grasp the wire ends, which are already respectively present at the end of the winding process of the coils or groups of coils after having been cut off from the wire supply, only after all coils have been drawn into the stator lamination package and immediately prior to fixing them on defined terminals or auxiliary terminals. In connection with stators with a low number of poles, grasping and fixing the wire ends in place does not present any difficulties and can be performed to a large extent without errors, since it can be easily determined with which coil a particular wire end is associated. However, in connection with stators with many poles, for example with 72 poles, there are 144 wire ends, which often cross and which can only be arranged by laborious manual work by interconnection or on terminals or auxiliary terminals.

It is known from U.S. Pat. No. 5,542,456 to initially fix the wire ends in place on holding devices which are connected with an element of the draw-in tools being used as coil receivers. In the course of the drawing-in process, a mechanical transfer of the wire ends to further holding elements, which are connected with the stator lamination package, takes place. The wire ends are finally brought into their predetermined position, which is fixed in relation to the stator, only after a further mechanical transfer process. The transfer of the wire ends during the drawing-in process represents an additional risk, in particular with thin wires and automatic production processes.

DE 31 14 407 C2 describes a drawing-in process, not performed up to now, wherein the coils are drawn down into a stator lamination package from above. On its upper end face, the latter is connected with a ring, on which the wire ends are fastened already in connection with the winding process of the coils. Such a ring has the disadvantage that it prevents the armoring of the end windings. The unusual drawing-in method furthermore has to rely on the fact that the coils created on a template must initially be received by a tool element consisting of rods arranged in a ring shape, and from there transferred between the lamellas of the draw-in tool. However, in connection with automatic production methods it is endeavored to strip the coil windings from the template directly into the gaps between the lamellas of the draw-in tool in order to prevent errors and damage to the wires in the course of transferring the wire windings.

OBJECT AND SUMMARY OF THE INVENTION

The invention is based on the object of providing a method and a draw-in tool element, which is suitable for executing the method, by means of which it is possible to interconnect the wire ends of the coils and to fasten them at the terminals or auxiliary terminals provided more dependably and faster than up to now, regardless of whether they are stripped off the winding template into a transfer tool or a draw-in tool.

The above object is attained in that while drawing-in the wire ends of the coils, they remain connected with the holding element and after the draw-in are mechanically removed from the holding element and transferred into the predetermined position, which is fixed in relation to the stator lamination package.

The invention offers the advantage that in the continuously progressing production process it is comparatively simple to temporarily connect the wire ends in a defined position with a separate holding element respectively directly in the course of winding a coil or group of coils, and to maintain them connected during the draw-in of the coils into the stator lamination package. This proposal is based on the consideration that following the termination of each winding process, the wire ends still are in a defined position. Therefore they should not be first released and, following the drawing-in process, laboriously caught again, but instead they should be maintained in order throughout the drawing-in process, as well as during a possible forming operation for shaping the end windings. A prerequisite for this is only the mentioned additional holding element, with which the wire ends remain connected during the drawing-in process and possibly during the forming operation. For example, a simple disk or plate with holders, or respectively clamping places, for the individual wire ends at the circumference is sufficient for this, which is connected with the draw-in tool element, or which can be placed without the stator lamination package onto the draw-in tool element, which is provided with parallel lamellas, or respectively rods arranged in a ring shape, or on a transfer tool, which receives the coils after winding and holds them until they are drawn into the stator lamination package.

Following the draw-in of the coils, it is recommended to turn the stator lamination package so that now the support plate constituting the disk-shaped holding element is located above the stator lamination package and can be lifted off, and to mechanically grasp the wire ends prior to or following the lifting process and to transfer them into the position determined by the terminals or auxiliary terminals, or to interconnect them. However, the novel method can also be performed without turning the stator lamination package.

In the preferred practical embodiment of the method, the coils are checked simultaneously or separately for current passage while the wire ends are still in the prealigned position, for example prior to or during draw-in and/or following this process. In this way the invention offers the possibility of already detecting wire failures or insulation errors in the coils at an early stage of production and of saving expenses in this way.

A draw-in tool element proposed for executing the method in accordance with the invention in the customary manner receives coil windings, which are wound on a template, between parallel lamellas arranged in a ring shape and can be connected with a draw-in device, through which the coils can be stripped off the lamellas into the grooves of a stator lamination package, but as a characteristic feature has a support plate for the coils, on whose exterior circumference holding devices for the releasable connection with the wire ends of the coils are attached, which can be provided with potential electrical contacts.

Exemplary embodiments of the invention will be explained in greater detail in what follows.

DETAILED DESCRIPTION OF THE PREFERRED EMBODIMENTS

Figure 1:
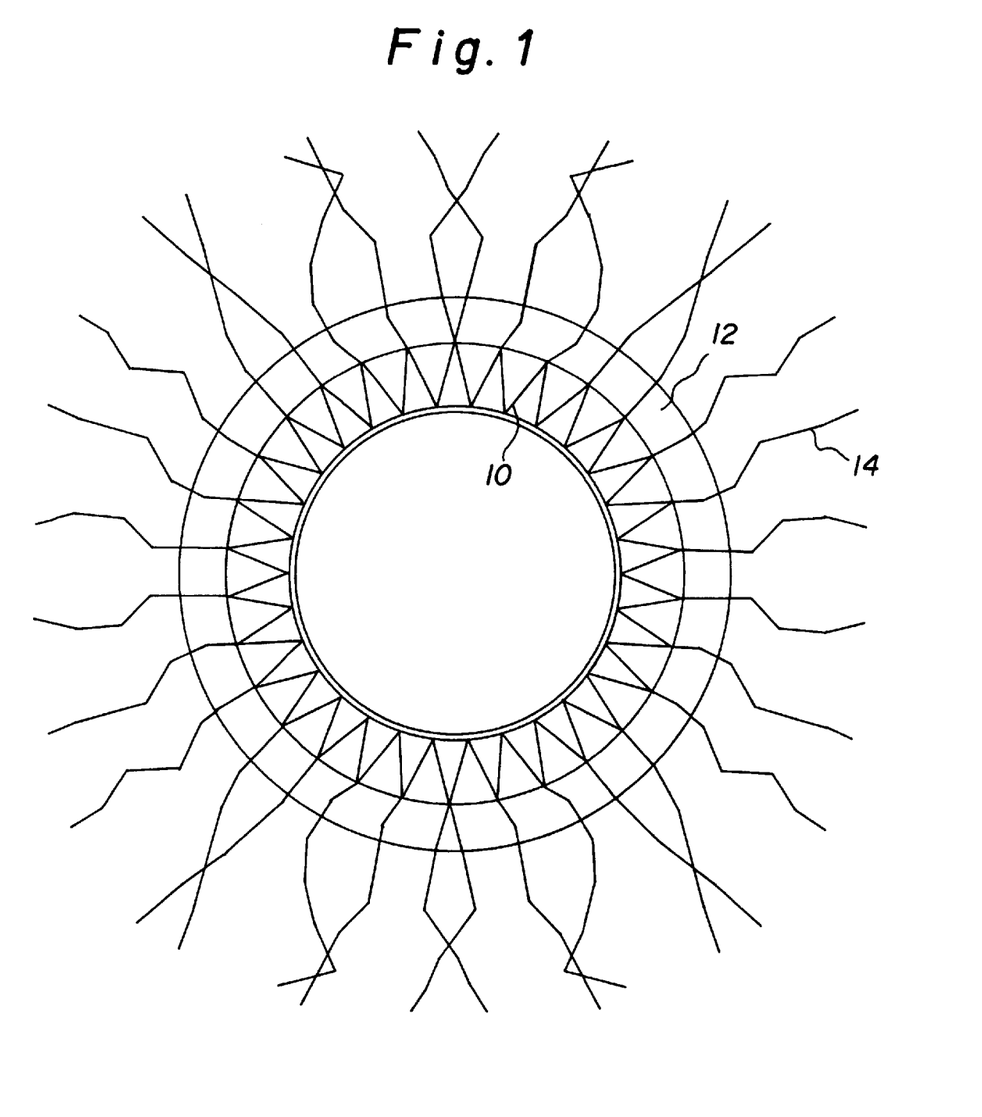
FIG. 1 is a simplified top view on a stator lamination package after the conventional draw-in of a plurality of coils prior to organizing and fixing the wire ends in place.
Figure 5:
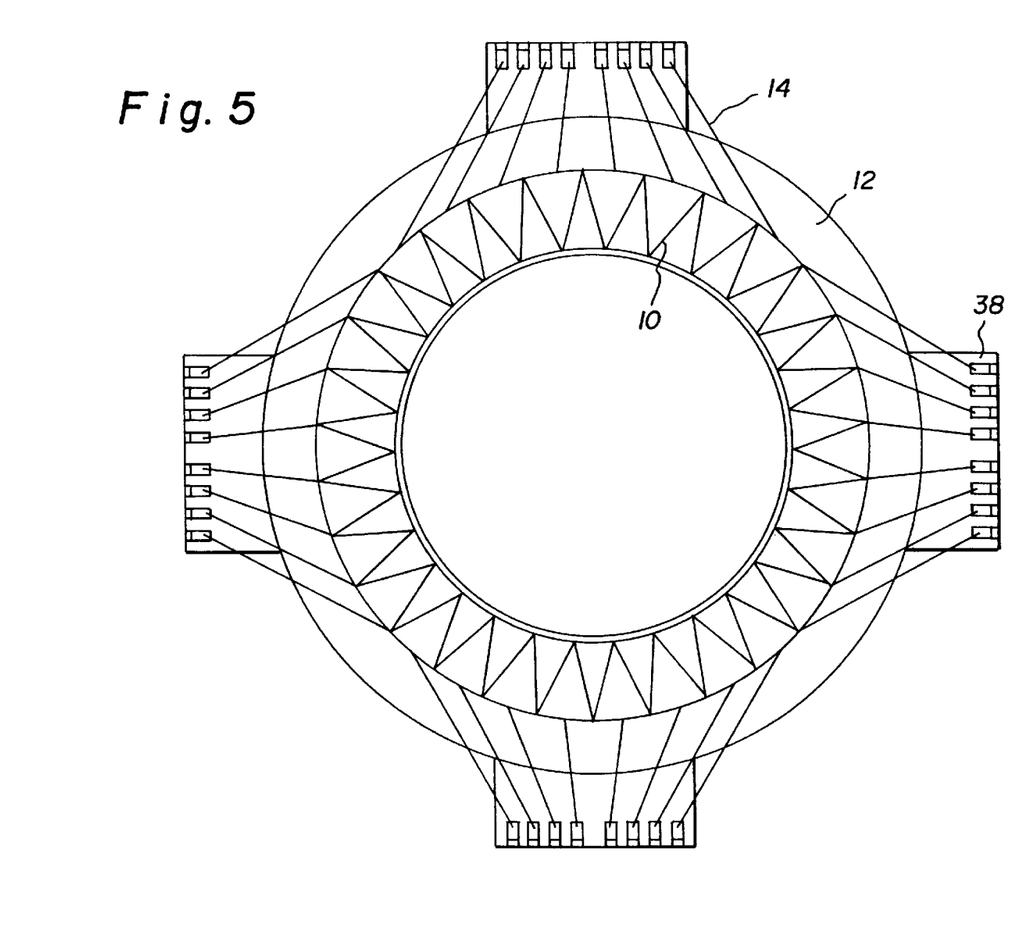
FIG. 5 is a top view on a stator wherein all wire ends of the coils have been fixed in place on auxiliary terminals.

The representation in accordance with FIG. 1 illustrates the problem that, following the customary draw-in of prewound coils 10, which have been shown here simplified, into a stator lamination package 12, it is very difficult, in particular if there are very many coils, or respectively groups of coils, to grasp the wire ends 14 of the coils in the course of automatic production and to respectively fix them in place in accordance with FIG. 5 in exactly defined terminals or auxiliary terminals, or to identify them for interconnection.

Figure 2:
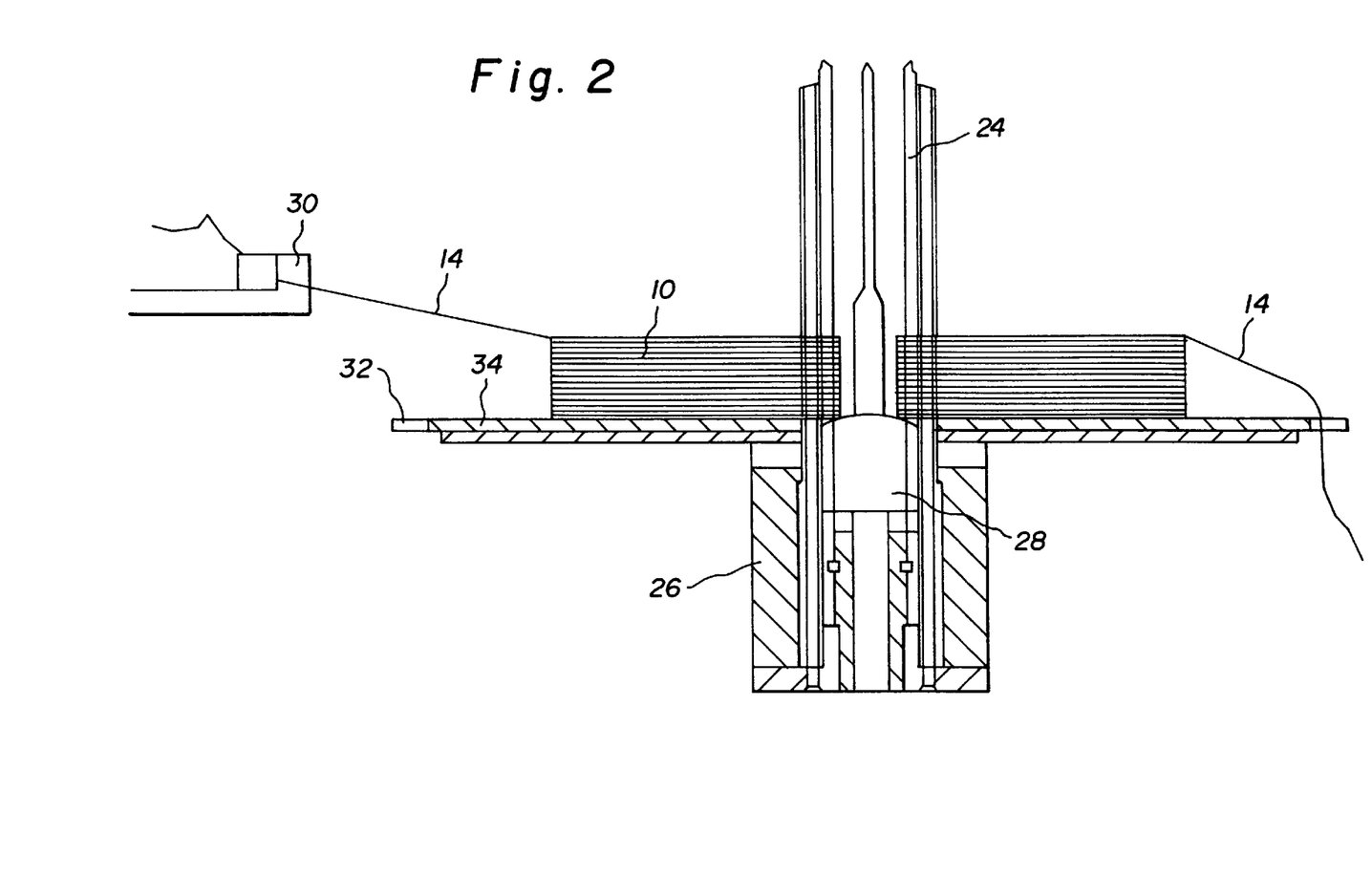
FIG. 2 is an axial longitudinal section through a draw-in tool element positioned under a template, not represented, after having received prewound coils.

The stages of a novel method are represented in FIGS. 2 to 5. The first method steps there start immediately following the winding of a coil 10. As is commonly customary, during and/or following the winding of the wire on a template, not represented, the coil windings are stripped off downward from the latter, so that they fall between the parallel rods or lamellas 24, arranged in a ring-shape, of a draw-in tool element, identified as a whole by 26. This draw-in tool element can be a so-called upper draw-in tool element which, after receiving the coils 10, is connected with the lower draw-in tool element of a draw-in device and is then used for drawing the coils 10 into a stator lamination package placed on the lamellas 24. The exemplary embodiment in accordance with FIG. 2 shows such a complete upper draw-in tool element 26 with a so-called draw-in star 28 which, following coupling with the remaining part of the draw-in device, is axially advanced along the lamellas 24, takes the coils along in the process and draws them into the grooves of the stator lamination package.

Figure 2A:
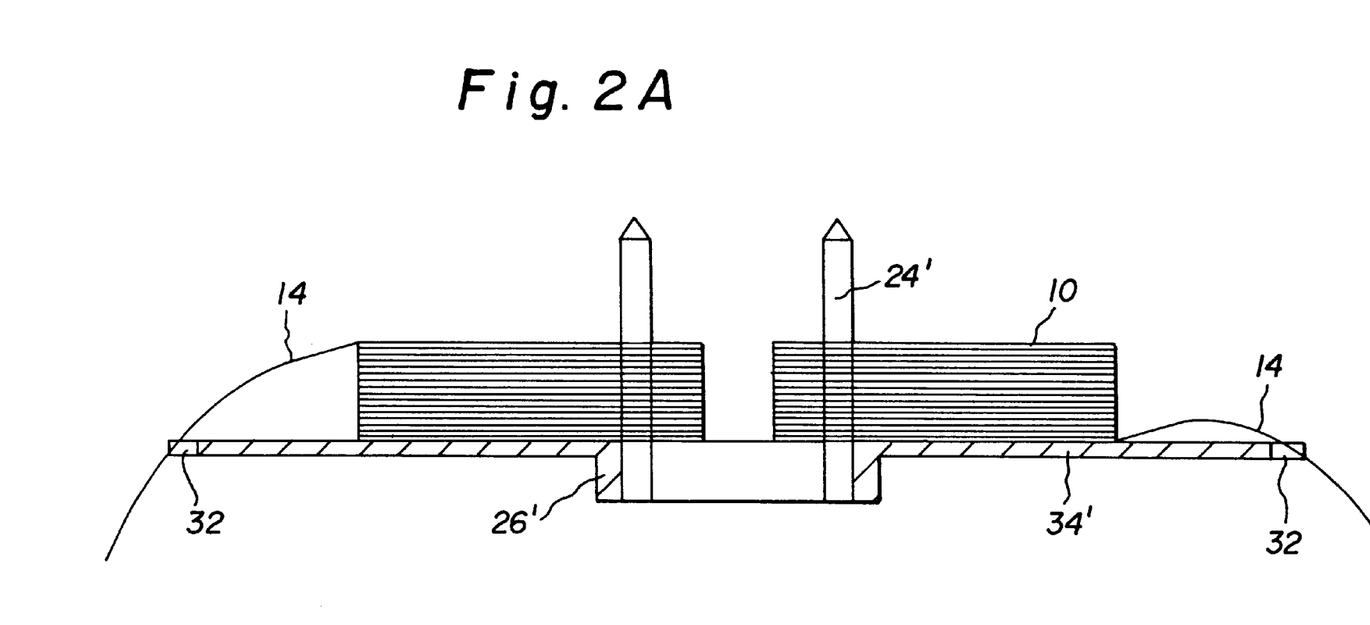
FIG. 2A represents a further exemplary embodiment of a draw-in tool element.
Figure 2B:
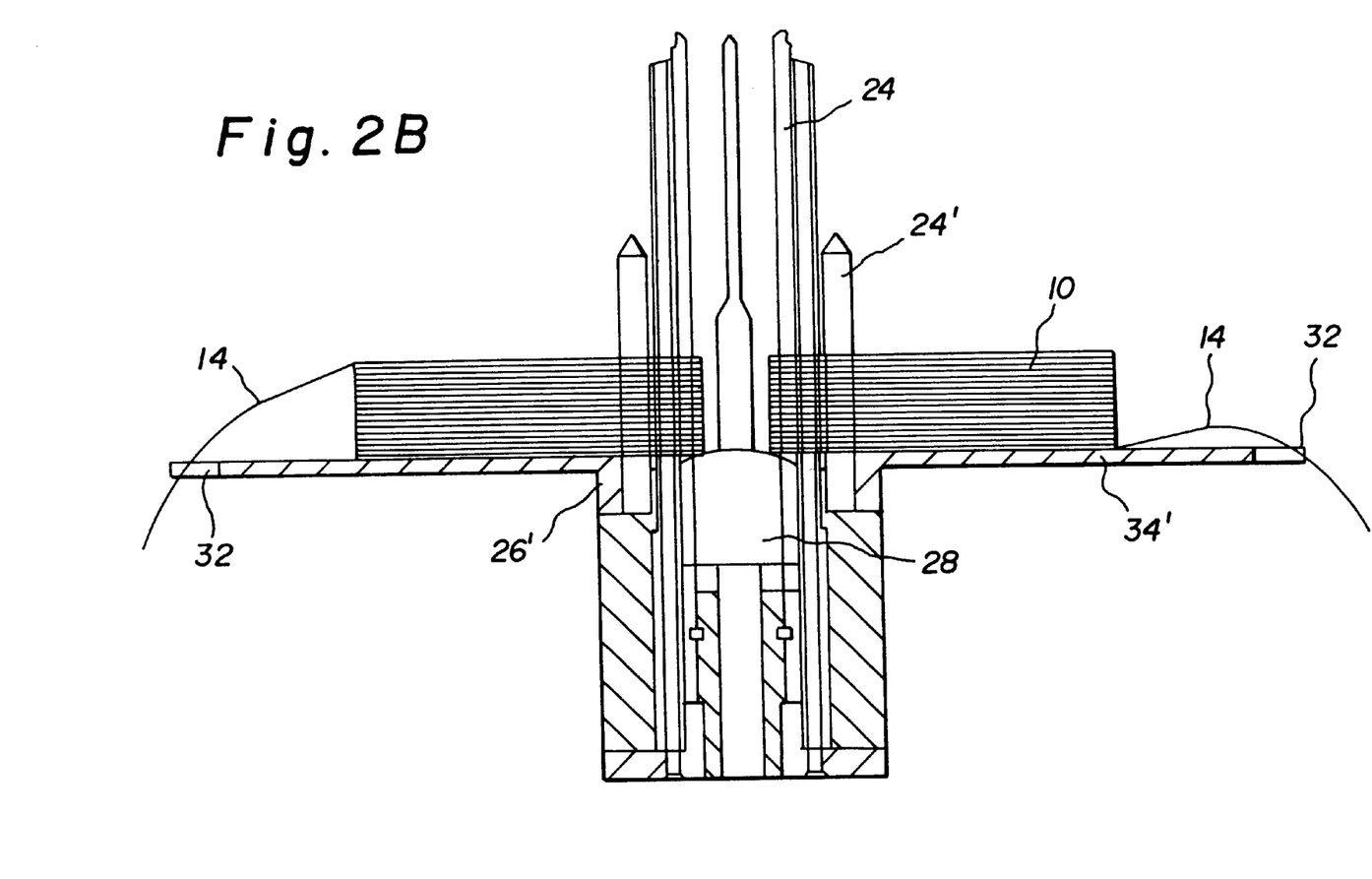
FIG. 2B represents the draw-in tool element of FIG. 2A following placement on a draw-in device.

In an alternative way, a draw-in tool element 26' represented in FIG. 2A could also be a simple, ring-shaped arrangement of parallel rods 24', which are arranged on a slightly greater radius than the lamellas 24 of the upper draw-in tool element and are connected with a plate 34' with an open center. Such a draw-in tool element 26', which can be produced very cost-effectively, possibly of plastic, in accordance with FIG. 2A initially picks up the coils 10 underneath the template and is then transported to the draw-in device and there, in accordance with FIG. 2B, is placed on the top in such a way that the lamellas 24 of the latter move from the bottom through the center opening in the base plate 34' and through the coils 10, which project radially inward away from the rods 24' of the simple draw-in tool element 26'. The fact that the simple draw-in tool element 26', which is essentially used as a transfer tool, remains seated on the draw-in device during the drawing-in process does not hamper the drawing-in process. During the first phase of the drawing-in process, the rods 24' act together with the lamellas 24 as a guide element for the wire coils. Such a simple transfer and draw-in tool element 26' is described in greater detail in German Patent Application 198 17 370.9.

Grippers and guide elements 30, also called length-pulling devices, represented in FIG. 2, are normally a portion of the winding device on which the coils 10 are prewound and which, after the required number of coil windings have been produced, grasp the wire, which is in a defined position between the template and an outlet nozzle, which circulates the template during the winding movement. With the winding nozzle at rest, the length-pulling devices 30 can perform a defined movement together with the clamped or loosely held wire, which usually is intended to obtain defined lengths of wires between successively wound coils, or at the end of the coils. The same length-pulling devices, or respectively gripping and guide elements, can also advantageously be used for the purposes of the invention. Since their movements are controllable, they can insert the wire ends 14 of the coils 10 in accordance with FIG. 2 into holding devices 32 on a support plate 34, which has an opening in the center and has been placed, removable from above, by means thereof on the lamellas 24 of the draw-in tool element 26. The coils 10 rest on the plate 34 until, in accordance with FIG. 3, they have been drawn into the grooves of a stator lamination device 12 by the draw-in device.

In connection with the mentioned simple transfer and draw-in tool element 26' in accordance with FIG. 2A, the base plate 34', which is connected with the rods 24' and on which the prewound coils 10' rest during the transfer from the winding to the draw-in device, can also be provided with holding devices 32 and in this way constitute the element for the temporary holding of the wire ends 14. The holding devices 32 can have the shape of metallic or rubber-elastic clamping places, or possibly also only of labyrinth-like recesses at the edge of the plate 34, or respectively 34'.

Figure 3:
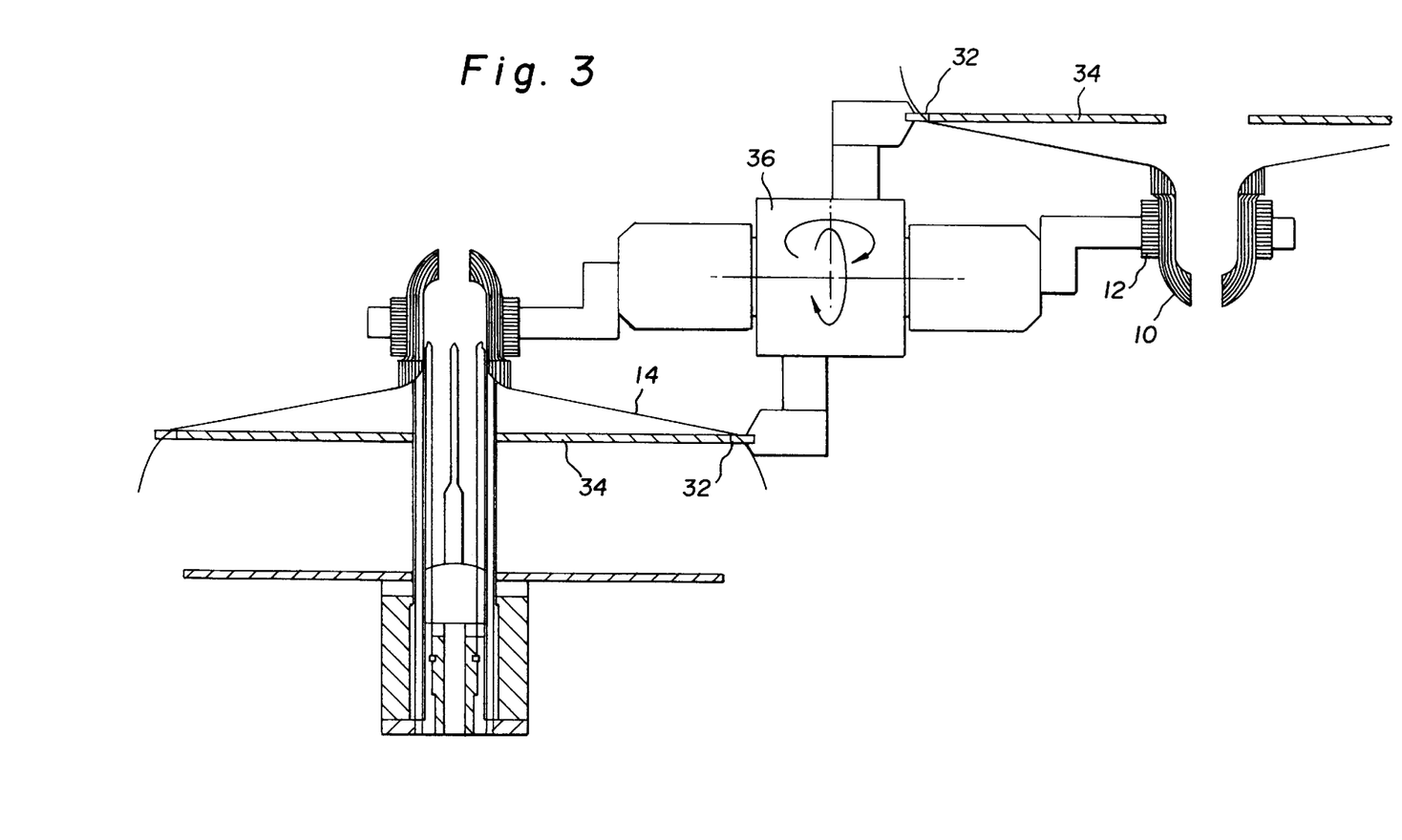
FIG. 3 represents the draw-in tool in FIG. 2 following the drawing of the coils into a stator lamination package, as well as turning of the latter.

While FIG. 2 represents the situation at a winding station, the situation at a draw-in station is represented in FIG. 3. The draw-in star 28 has been moved up, has taken along the coils 10 in the process and pulled them into a stator lamination device, and thereafter has been retracted again. During the drawing-in process the plate 34 has also been lifted by the clamped-on wire ends or an auxiliary gripper. It is understood that in individual cases the length of the wire ends 14 can be selected to be sufficiently long, so that the plate 34 is not also lifted during the drawing-in process. It can also be channeled through a subsequent forming process.

Figure 4:
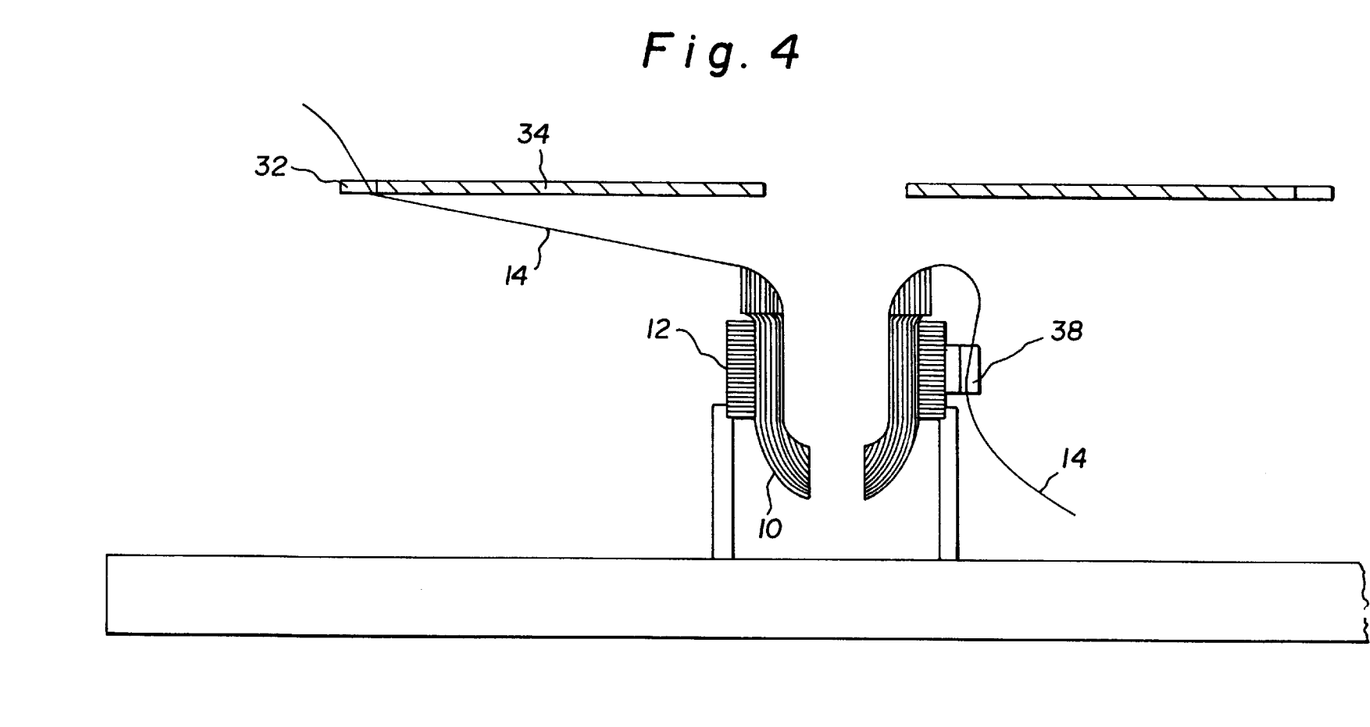
FIG. 4 represents the turned stator lamination package in FIG. 3 in the phase of the attachment of the wire ends to auxiliary terminals.

In the further progress of the operation in the course of the production of a stator, the stator lamination package, together with the drawn-in coils and the plate 34, is turned upside down in the case of this example, although this is not absolutely necessary. In FIG. 3 the turning installation is identified by 36. Because of the turning, the plate 34 is now above the stator lamination package. It is possible in this position for the wire ends 14, which are respectively maintained in a defined position by the holding devices 32, to be gripped by a gripper, not represented, and to be connected in accordance with FIG. 4 with a terminal or auxiliary terminal 38 which is, for example, attached to a stator lamination package or on a pallet supporting the latter. Subsequently the support plate 34 can again be placed on an empty transfer and draw-in tool element 26, and the process described by means of FIGS. 2 to 4 is repeated. The stator, which is finished up the connecting the wire ends with electrical terminals or auxiliary terminals 38, can be seen in FIG. 5.

What is claimed is:

1. A method for producing a stator for an electric machine comprising the steps of:

winding coils of wire such that wire ends of each coil have a defined position after completion of the coil;

temporarily connecting said wire ends of each coil previously provided in said defined position to a holding element having a pre-aligned position for said wire ends of each coil;

drawing the coils at a drawing station into a stator lamination package which is separate from the holding element, said drawing step including the step of keeping the wire ends of the coils connected to the holding element;

removing of the stator lamination package and the holding element from the drawing station to a subsequent station, said removing step including the step of keeping the wire ends of the coils connected to the holding element; and mechanically releasing the wire ends of the coils from the holding element at the subsequent station and fixing the wire ends in relation to the stator lamination package.

2. A method for producing a stator as claimed in claim 1, wherein said winding step further includes transferring of the coils to a draw-in tool element having parallel lamellas arranged in a ring shape and a support plate for the coils which also serves as the holding element.

3. A method for producing a stator as claimed in claim 2, wherein said removing step further includes the steps of:

a) turning the stator lamination package, b) lifting of the support plate upward, and c) mechanically grasping the wire ends prior to or after the lifting step.

4. A method for producing a stator as claimed in claim 1, wherein said connecting step includes the step of testing each coil for current passage while the wire ends of each coil are in the pre-aligned position.

* * * * *